United States Patent
Paukshto et al.

(10) Patent No.: US 7,527,834 B2
(45) Date of Patent: May 5, 2009

(54) RETARDATION FILMS FOR THE ELIMINATION OF LEAKAGE OF LIGHT THROUGH CROSS POLARIZERS IN LCD

(75) Inventors: Michael V. Paukshto, Foster City, CA (US); Pochi Yeh, Thousand Oaks, CA (US)

(73) Assignee: Nitto Denko Corporation, Ibaraki-Shi (JP)

( * ) Notice: Subject to any disclaimer, the term of this patent is extended or adjusted under 35 U.S.C. 154(b) by 596 days.

(21) Appl. No.: 11/202,536

(22) Filed: Aug. 11, 2005
(Under 37 CFR 1.47)

(65) Prior Publication Data
US 2006/0292372 A1 Dec. 28, 2006

Related U.S. Application Data

(60) Provisional application No. 60/606,253, filed on Aug. 31, 2004.

(51) Int. Cl.
*C09K 19/02* (2006.01)
*G02F 1/13363* (2006.01)

(52) U.S. Cl. .......................... 428/1.1; 428/1.3; 428/1.5; 349/117; 349/119

(58) Field of Classification Search .................. 428/1.1, 428/1.3, 1.5, 411.1; 349/117, 119
See application file for complete search history.

(56) References Cited

U.S. PATENT DOCUMENTS

| 6,686,975 | B2 | 2/2004 | Anderson et al. | |
|---|---|---|---|---|
| 7,166,161 | B2 * | 1/2007 | Lazarev et al. | 117/4 |
| 7,267,849 | B2 * | 9/2007 | Lazarev et al. | 428/1.1 |
| 2002/0167620 | A1 * | 11/2002 | Anderson et al. | 349/5 |
| 2004/0142183 | A1 * | 7/2004 | Lazarev et al. | 428/426 |
| 2005/0196550 | A1 * | 9/2005 | Lazarev et al. | 428/1.1 |
| 2005/0206817 | A1 * | 9/2005 | Kajita et al. | 349/119 |

FOREIGN PATENT DOCUMENTS

| CN | 1462560 A | | 12/2003 |
|---|---|---|---|
| CN | 1645205 A | | 7/2005 |
| WO | WO 2004042461 | * | 5/2004 |

OTHER PUBLICATIONS

Chinese Office Action dated Oct. 10, 2008, issued in corresponding Chinese Patent Application No. 200580028998.5.

* cited by examiner

*Primary Examiner*—Shean C Wu
(74) *Attorney, Agent, or Firm*—Westerman, Hattori, Daniels & Adrian, LLP.

(57) ABSTRACT

The compensator design, which comprises at least two layers of birefringent material, one of them is a positive A-plate and another one is a negative A-plate, makes possible a significant improvement in color rendering properties and contrast ratios of liquid crystal displays over a wide range of viewing angle.

13 Claims, 12 Drawing Sheets

RETARDATION FILMS FOR THE ELIMINATION OF LEAKAGE OF LIGHT THROUGH CROSS POLARIZERS IN LCD

RELATED APPLICATIONS:

This application claims priority under 35 U.S.C. § 119(e) to U.S. Provisional Application No. 60/606,253 filed Aug. 31, 2004, the disclosure of which is hereby incorporated by reference in its entirety.

FIELD OF THE INVENTION

This invention relates to liquid crystal displays (LCDs) and, in particular, to methods of maximizing the field of view and elimination of leakage of LCDs while maintaining high contrast ratio and minimal variance in relative gray levels over a wide range of viewing angles.

BACKGROUND OF THE INVENTION

High quality information display such as high contrast ratio and gray-scale stability can be obtained only within a narrow range of viewing angles centered about the normal incidence in conventional LCDs. The angular dependence of the viewing is due to the fact that both the phase retardation and optical path in most LC cells are functions of viewing angles. The narrow viewing angle characteristics have been a significant problem in advanced applications such as avionics displays and wide-screen displays, which require LCDs whose contrast and gray scale must be as invariant as possible with respect to viewing angle.

Accordingly, there is a need of further development in LCDs for high performance applications. The present invention provides a solution to the prior art problem by providing retardation films to achieve high contrast ratios and gray-scale level stability in LCDs.

BRIEF DESCRIPTION OF THE DRAWINGS

The present invention will be better understood by the following detail description and appended claims with reference to the drawings below, in which:

DETAILED DESCRIPTION OF THE INVENTION

Figure 1:
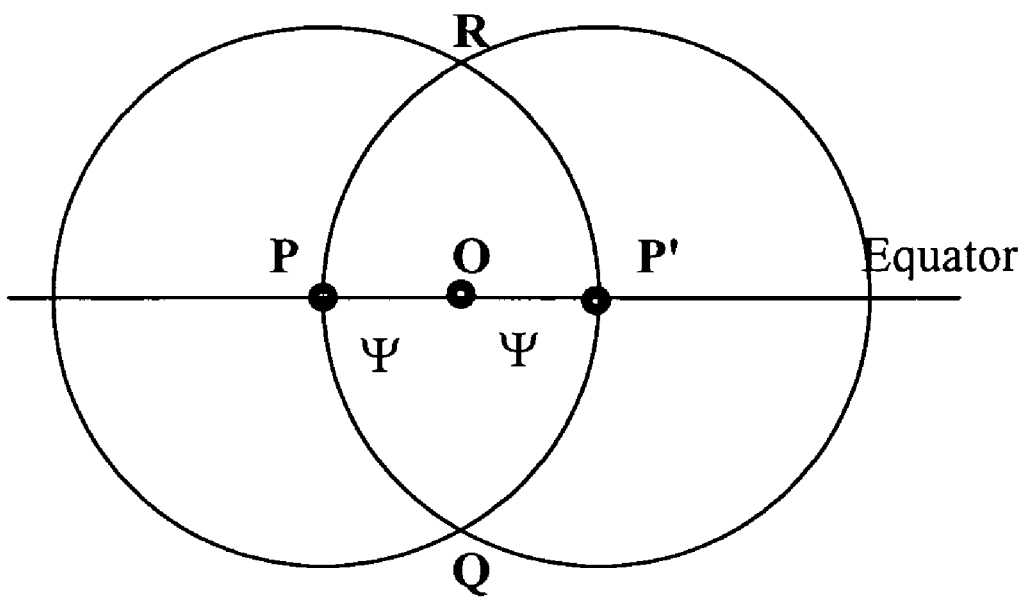
FIG. 1 shows a Poincaré sphere illustrating polarization states.

Various embodiments of the present invention are described hereinafter with reference to the figures. It should also be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and can be practiced in any other embodiments of the present invention. For instance, in the drawings and the following detailed description, the present invention is described with embodiments of retardation films with vertically aligned liquid crystal (VALC) cells. It will be appreciated that the claimed invention can be used with any other liquid crystal cells such as twisted nematic liquid crystal (TN-LC) cells.

FIG. 1 shows a Poincaré sphere illustrating various polarization states. In FIG. 1, O represents polarization of transmitted component of first O-type polarizers at normal incidence; P represents polarization of transmitted component of first O-type polarizers at oblique incidence (angular deviations from 0 up to 16 degrees on the equatorial plane, 8 degrees in physical space); and P' represent polarization of absorbed component of 2nd O-type polarizers at oblique incidence. PQP' is substantially an equilateral triangle on Poincaré sphere. This triangle shrinks to a point O at normal incidence.

A pair of crossed polarizers only eliminate light at normal incidence. For off-axis light, the transmission polarization state of the first polarizer is rotated by up to 8 degrees in physical space, while the absorption polarization state of the second polarizer is rotated by up to 8 degrees in the opposite direction. These polarization states are shown as P and P' on the Poincaré sphere. The present invention provides phase retardation films or compensators to transform the polarization state from P to P' for off-axis light without affecting the normally incident light.

In one embodiment, the present invention provides compensator for two polarizers in "dark-state" comprising at least two layers from birefringent materials, wherein one of the layers operates as a positive A-plate and another layer operates as a negative A-plate. In another embodiment, the compensator further includes a negative C-plate between the birefringent layers.

In one embodiment, the negative A-plate comprises at least one layer of a birefringent material which has a crystal structure formed by at least one polycyclic organic compound with conjugated π-system, and an intermolecular spacing of 3.4±0.3 Å is in the direction of at least one of optical axes.

In one embodiment, the negative C-plate comprises at least one layer of a birefringent material which has a crystal structure formed by at least one polycyclic organic compound with conjugated π-system, and an intermolecular spacing of 3.4±0.3 Å is in the direction of at least one of optical axes.

In some embodiments, the compensator of the present invention further includes a positive C-plate between the birefringent layers.

In some embodiments, the compensator further includes at least two polarizers, wherein the axes of transmission of the two polarizers are mutually perpendicular. The organic compound forming the birefringent material may include ionogenic functional groups such as —COOH, —SO$_3$H, PO$_3$H, NH$_2$. In one embodiment, the organic compounds is acenaphtho[1,2-b]quinoxaline sulfoderivative of the general structural formula:

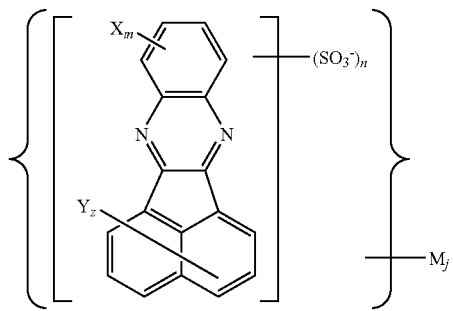

where n is an integer in the range of 1 to 4;
m is an integer in the range of 0 to 4;
z is an integer in the range of 0 to 6, and m+z+n≦10;
X and Y are individually selected from the group consisting of CH$_3$, C$_2$H$_5$, OCH$_3$, OC$_2$H$_5$, Cl, Br, OH, and NH$_2$;
M is a counterion; and
j is the number of counterions in the molecule.

Examples of the organic compounds having the above general formula include but are not limited to the following structures I-VIII:

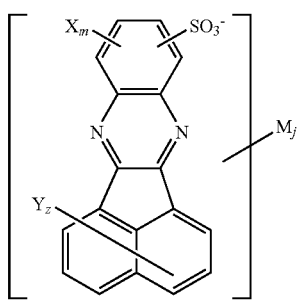

I

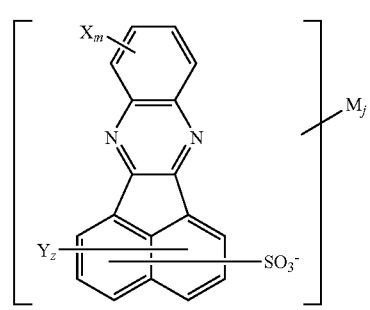

II where m is an integer in the range of 0 to 3, and z is an integer in the range of 0 to 6;

where m is an integer in the range of 0 to 4, and z is an integer in the range of 0 to 5;

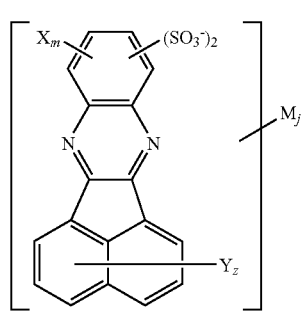

III where m is an integer in the range of 0 to 2, and z is an integer in the range of 0 to 6;

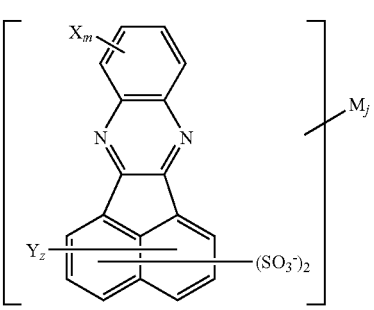

IV where m is an integer in the range of 0 to 4, and z is an integer in the range of 0 to 4;

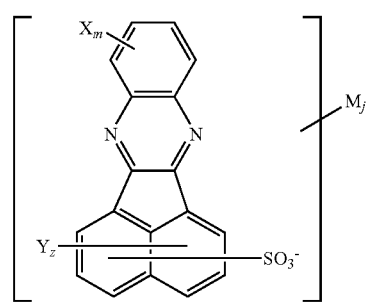

V where m is an integer in the range of 0 to 3, and z is an integer in the range of 0 to 5;

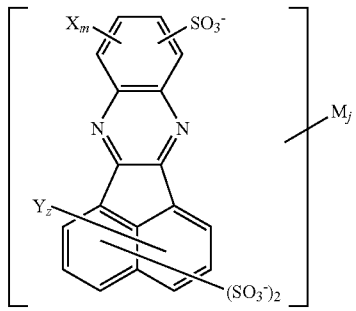

VI where m is an integer in the range of 0 to 3, and z is an integer in the range of 0 to 4;

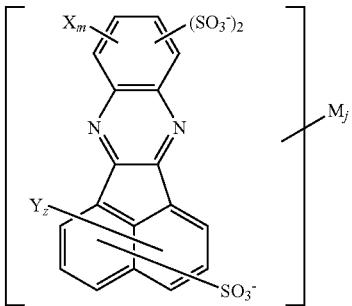

VII where m is an integer in the range of 0 to 2, and z is an integer in the range of 0 to 5;

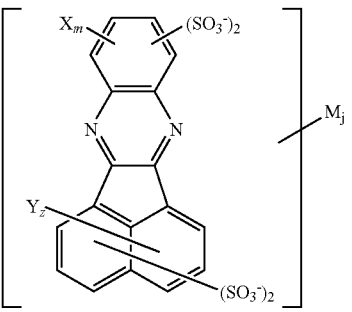

VIII where m is an integer in the range of 0 to 2, and z is an integer in the range of 0 to 4;
and where X, Y are individually selected from the group consisting of $CH_3$, $C_2H_5$, $OCH_3$, $OC_2H_5$, Cl, Br, OH, and $NH_2$, M is a counterion, and j is the number of counterions in the molecule.

FIGS. 2-5 show specific configurations for cross-polarizers leakage elimination.

Figure 2A:
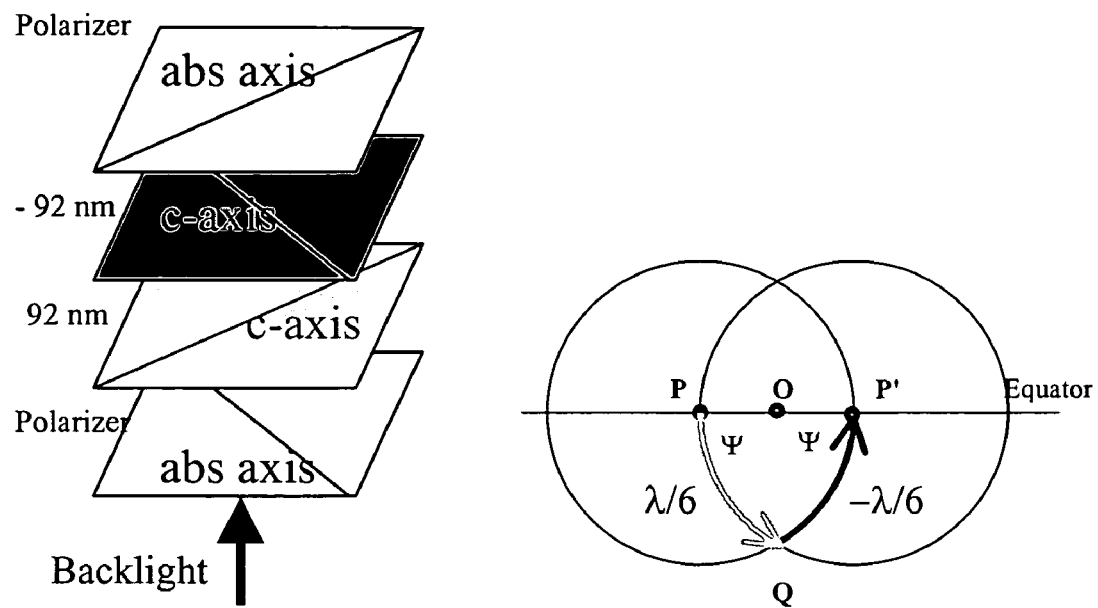
FIG. 2a shows an (+a, −a) wave plate combination where the retardance of each plate is $\Delta nd = \lambda/6$ (=92 nm at $\lambda$=550 nm). The +a plate transforms the polarization state from P to Q. The −a plate then transforms the polarization state from Q to P'.
Figure 2B:
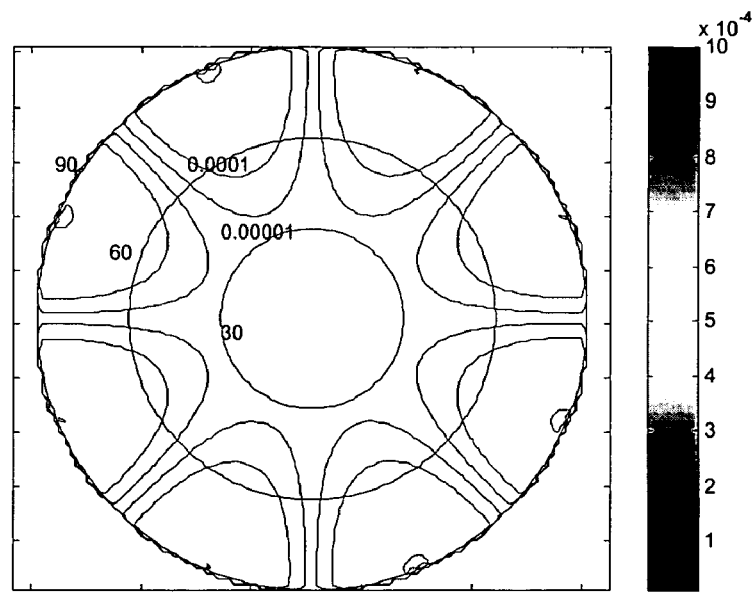
FIG. 2b shows an equi-transmittance contours of unpolarized light of Case 1 using Extended Jones matrix method.

Case 1 shown in FIGS. 2a and 2b includes a combination of a positive a-plate and then a negative a-plate. The retardance of each plate is $\Delta nd=\lambda/6$ (=92 nm at $\lambda=550$ nm). The +a plate transforms the polarization state from P to Q. The -a plate then transforms the polarization state from Q to P'.

Figure 3:
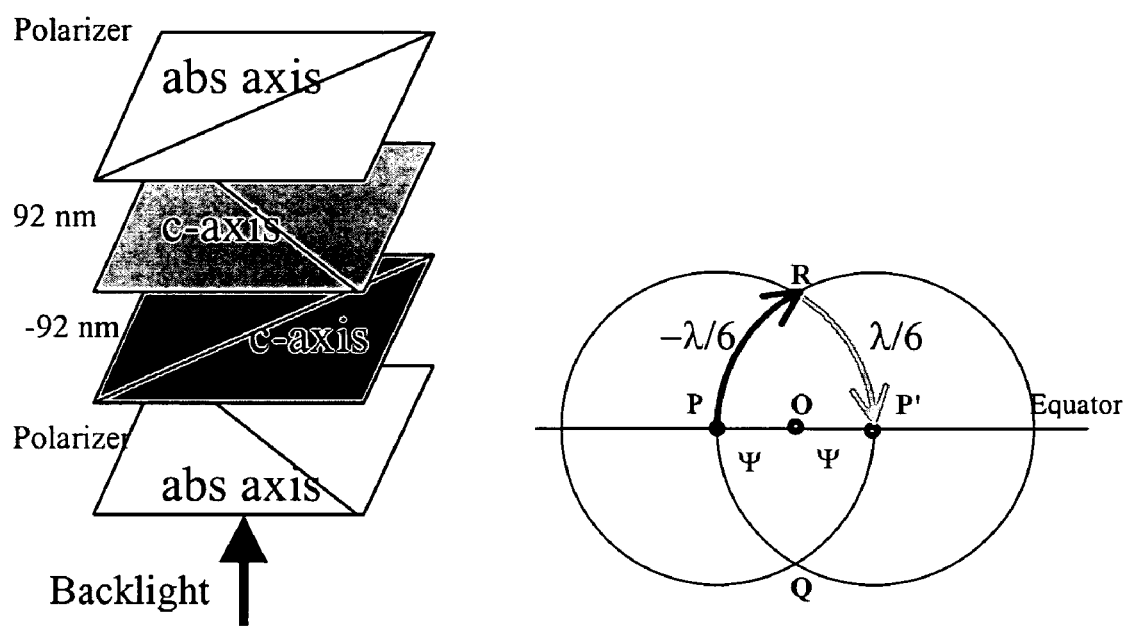
FIG. 3 shows an (−a, +a) wave plate combination where the retardance of each plate is $\Delta nd = \lambda/6$ (=92 nm at $\lambda$=550 nm). The −a plate transforms the polarization state from P to R. The +a plate then transforms the polarization state from R to P'.

Case 2 shown in FIG. 3 includes a combination of a negative a-plate and then a positive a-plate. The retardance of each plate is $\Delta nd=\lambda/6$ (=92 nm at $\lambda=550$ nm). The -a plate transforms the polarization state from P to R. The +a plate then transforms the polarization state from R to P'.

Figure 4A:
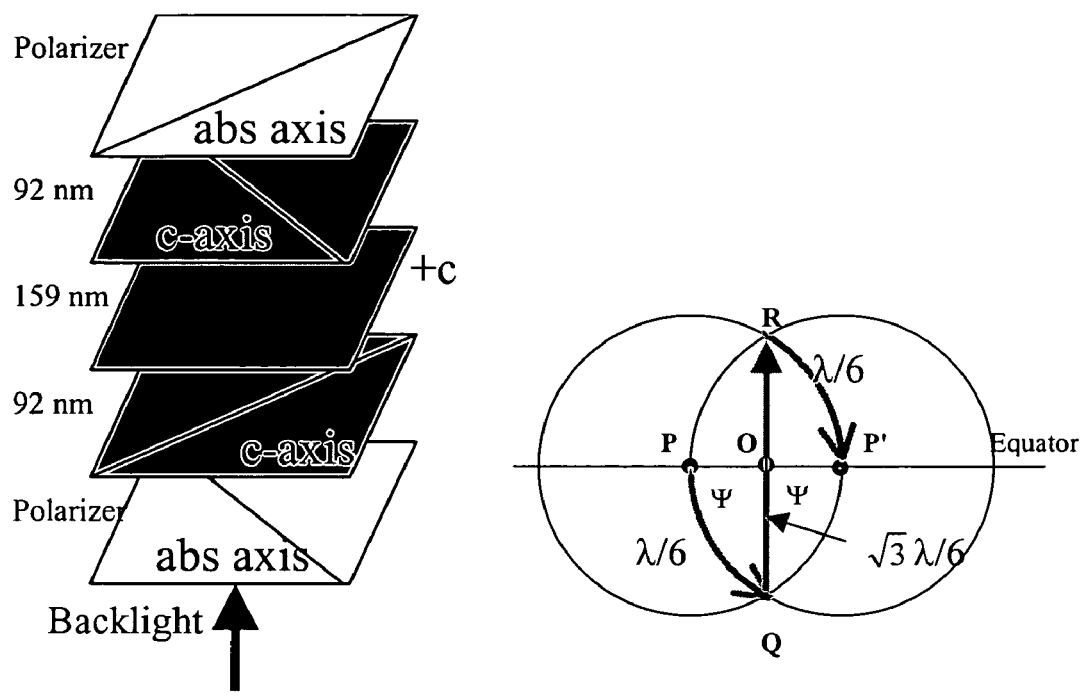
FIG. 4a shows an (+a, +c, +a) wave plate combination where the retardance of a plate is $\Delta nd = \lambda/6$ (=92 nm at $\lambda$=550 nm) and the retardance of c plate is $\Delta nd = \sqrt{3}\lambda/6$ (=159 nm at $\lambda$=550 nm). The +a plate transforms the polarization state from P to Q. The +c plate then transforms the polarization state from Q to R. The last +a plate then transforms the polarization state from R to P'.
Figure 4B:
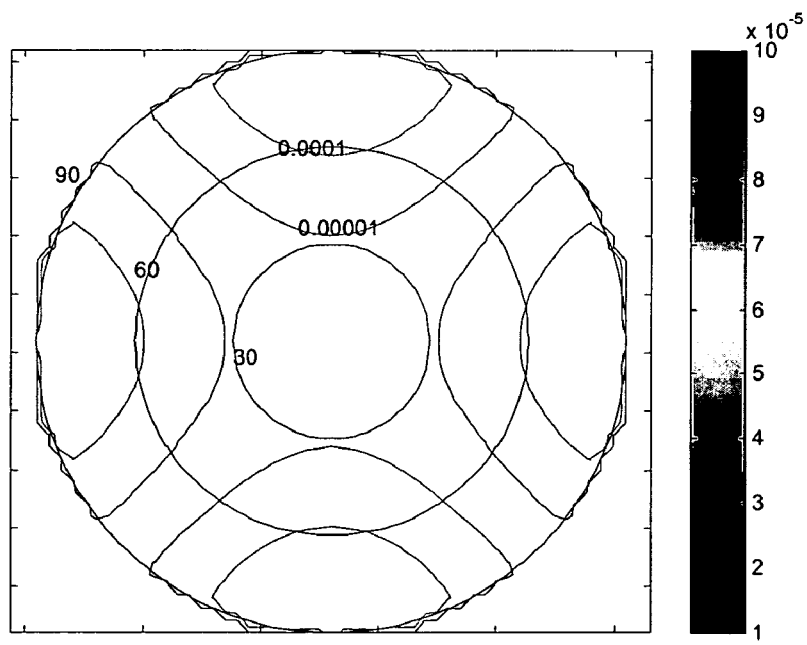
FIG. 4b shows an equi-transmittance contours of unpolarized light for Case 3.

Case 3 shown in FIG. 4 includes an ACA combination: a positive a-plate, a positive c-plate and then a positive a-plate. the retardance of a plate is $\Delta nd=\lambda/6$ (=92 nm at $\lambda=550$ nm) and the retardance of c plate is: $\Delta nd=\sqrt{3}\,\lambda/6$ (=159 nm at $\lambda=550$ nm). The +a plate transforms the polarization state from P to Q. The +c plate then transforms the polarization state from Q to R. The last +a plate then transforms the polarization state from R to P'.

Figure 5:
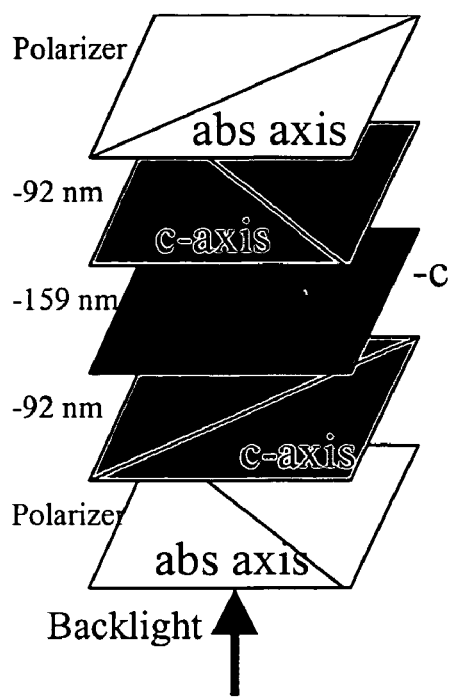
FIG. 5 shows an (−a, −c, −a) wave plate combination where the retardance of a plate is $\Delta nd = \lambda/6$ (=92 nm at $\lambda$=550 nm) and the retardance of c plate is $\Delta nd = \sqrt{3}\lambda/6$ (=159 nm at $\lambda$=550 nm). The −a plate transforms the polarization state from P to R. The −c plate then transforms the polarization state from R to Q. The last −a plate then transforms the polarization state from Q to R.
Figure 5:
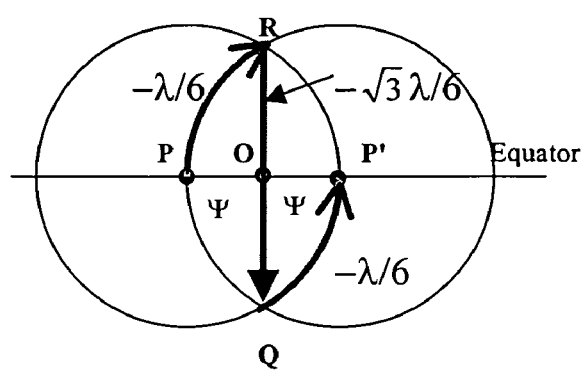

Case 4 shown in FIG. 5 includes an ACA-combination, a negative a-plate, a negative c-plate and then a negative a-plate. The retardance of a plate is $\Delta nd=\lambda/6$ (=92 nm at $\lambda=550$ nm) and the retardance of c plate is $\Delta nd=\sqrt{3}\,\lambda/6$ (=159 nm at $\lambda=550$ nm). The -a plate transforms the polarization state from P to R. The -c plate then transforms the polarization state from R to Q. The last -a plate then transforms the polarization state from Q to R.

Figure 6:
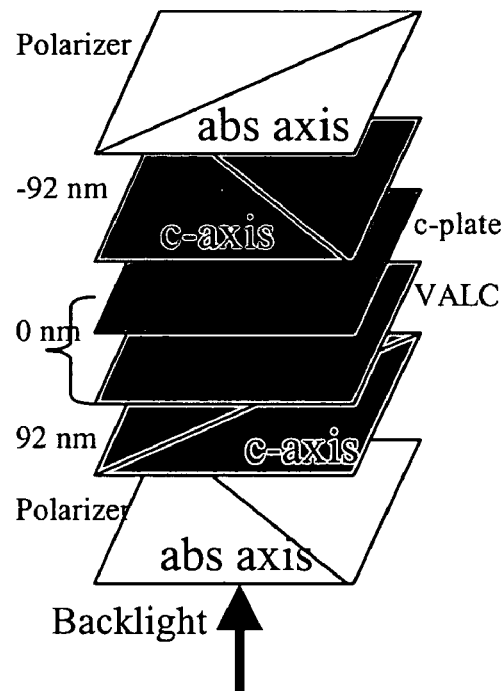
FIGS. 6-9 show combinations of vertically aligned liquid crystal (VALC) cell and c-plate with the designs shown in FIGS. 2-5.
Figure 7:
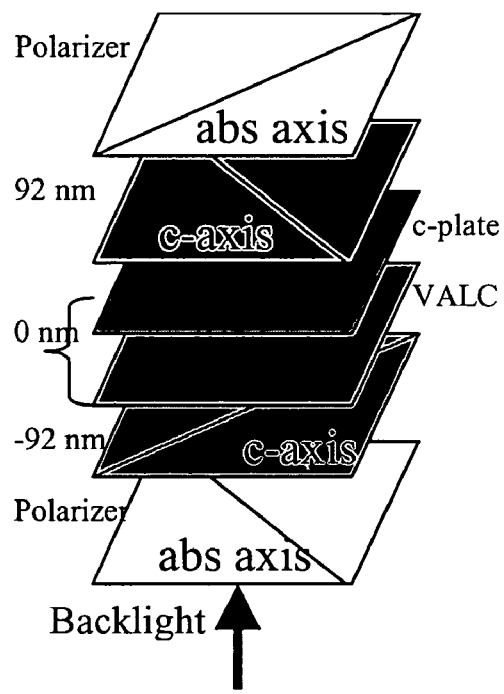
Figure 8:
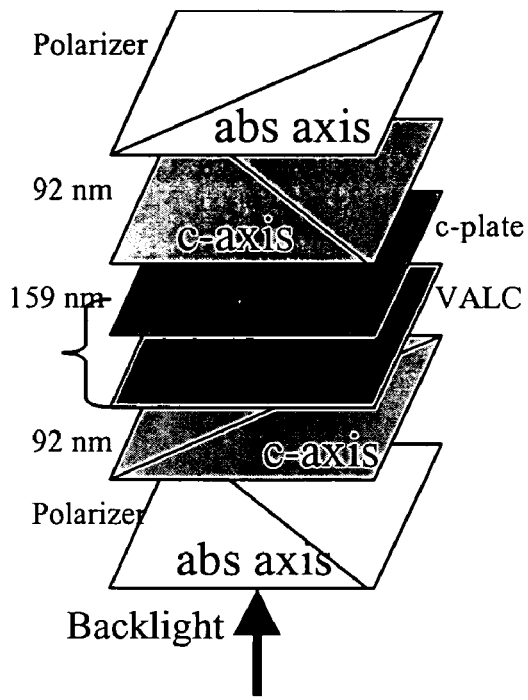
Figure 9:
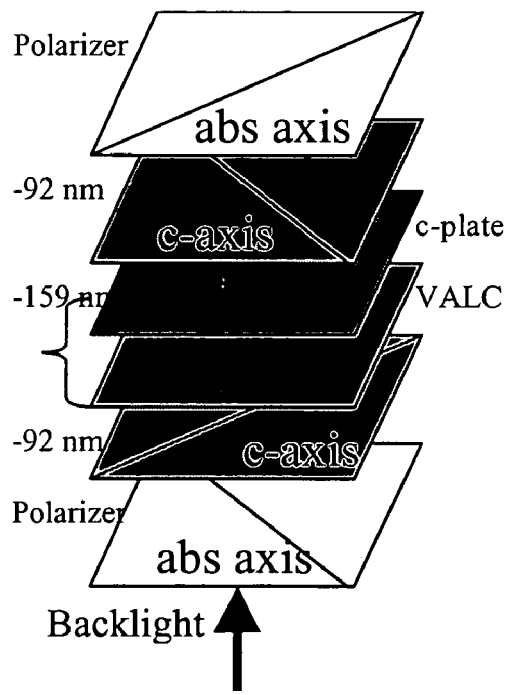

The configurations in Cases 1-4 can be combined with LC cells such as vertically aligned LC (VA LC) cells or field-on state of a TN-LC cells in LCDs. FIG. 6 illustrates a (VALC, c-plate) combination placed after a polarizer or before an analyzer. FIG. 7 illustrates a (VALC, c-plate) combination placed after a polarizer or before an analyzer. FIG. 8 illustrates a (VALC, c-plate) combination placed after a polarizer or before an analyzer. FIG. 9 illustrates a (VALC, c-plate) combination placed after a polarizer or before an analyzer.

It should be pointed out that other configurations are possible and the present invention is not limited to the above specific exemplary configurations.

Optically anisotropic media is characterized by its second rank dielectric tensor. The classification of the compensator plates is tightly connected to the orientation of the principal axes of a particular dielectric tensor with respect to the natural coordinate frame of the plate. The natural xyz coordinate frame of the plate is chosen in a way when the z-axis is parallel to its normal direction.

Figure 10:
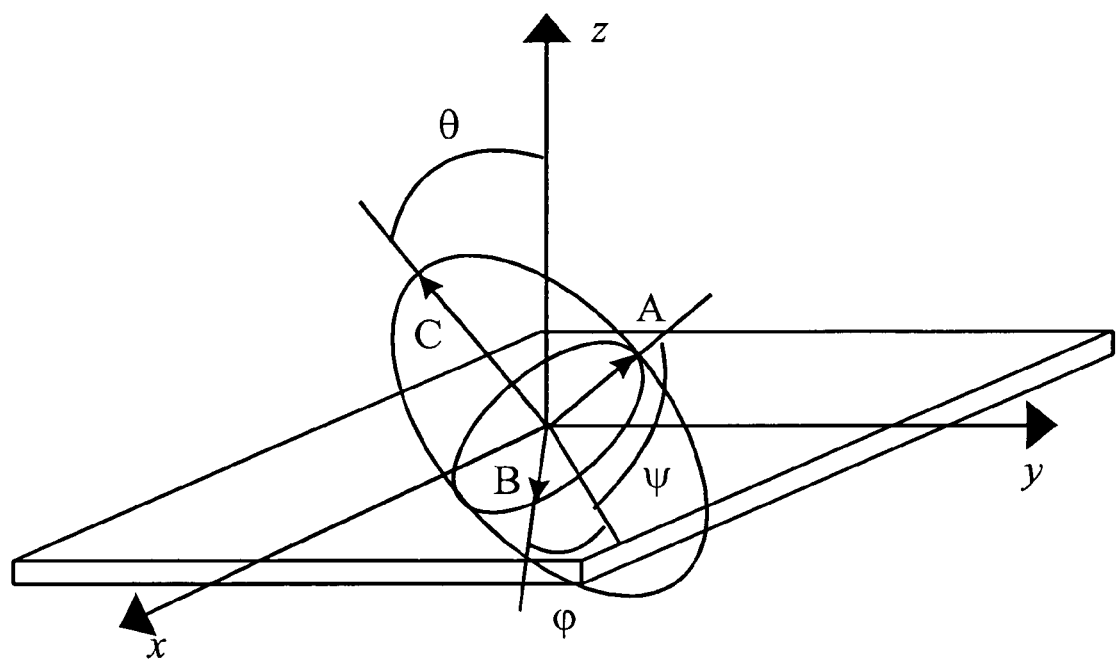
FIG. 10 demonstrates a principal dielectric tensor axes orientation in a general case of optically anisotropic media.

The orientation of the principal axes can be characterized by three Euler angles $\phi$, $\theta$, $\psi$, which, together with the principal dielectric tensor components ($\in_A$, $\in_B$, $\in_C$) uniquely define different types of the optical compensators (FIG. 10). The case when all the principal components of the dielectric tensor are unequal corresponds to the biaxial compensator. In this case the plate has two optical axes. For instance, in case of $\in_A<\in_B<\in_C$ these optical axes are in the plane of C and A axes on both sides with respect to the C-axis. In a uniaxial limit when $\in_A=\in_B$ we have the degenerated case when these two axes coincide with the C-axis that is just a single optical axis.

The zenithal angle between the C-axis and the z-axis is important in definitions of different compensator types.

Figure 11:
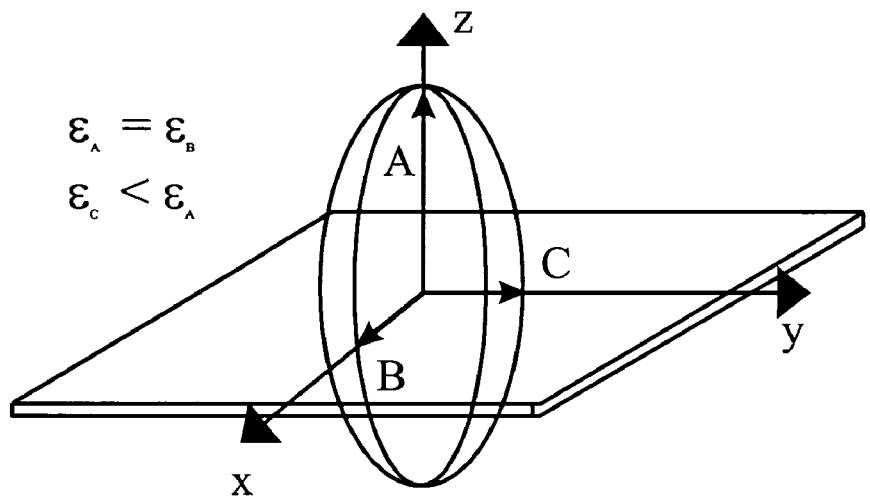
FIG. 11 demonstrates a principal dielectric tensor axes orientation in cases including a negative A-plate compensator.
Figure 12:
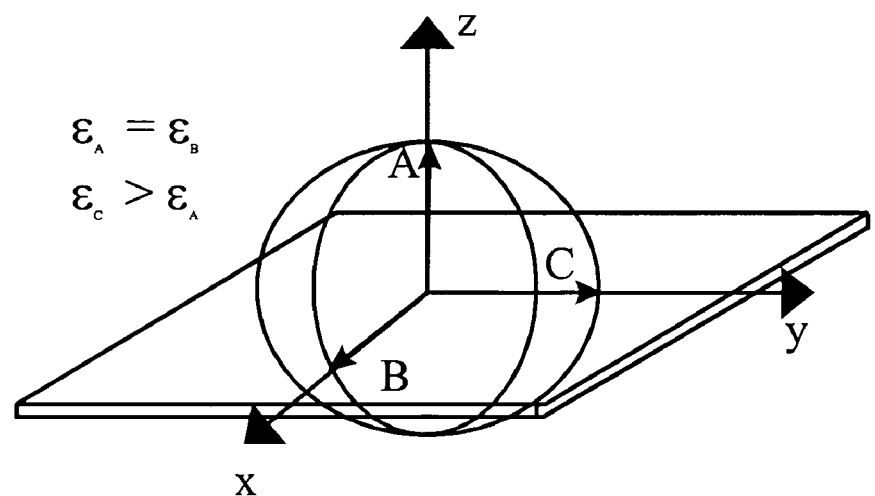
FIG. 12 demonstrates a principal dielectric tensor axes orientation in cases including a positive A-plate compensator.

If a plate is defined by Euler angle $\theta=\pi/2$ and $\in_A=\in_B,\neq\in_C$ then it is called "A-plate." In this case the principal C-axis lies in the plane of the plate (xy-plane), while A-axis is normal to the plane surface (due to the uniaxial degeneration the orthogonal orientations of A and B-axes can be chosen arbitrary in the plane that is normal to the xy-surface). In a case of $\in_A=\in_B<\in_C$ the plate is called "positive A-plate" (FIG. 11). Contrary, if $\in_A=\in_B>\in_C$ the plate is defined as the "negative A-plate" (FIG. 12).

Figure 13:
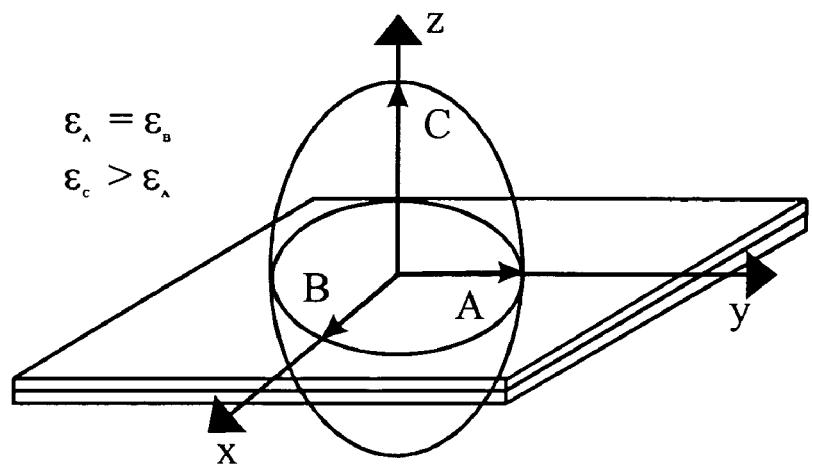
FIG. 13 demonstrates a principal dielectric tensor axes orientation in cases including a positive C-plate compensator.
Figure 14:
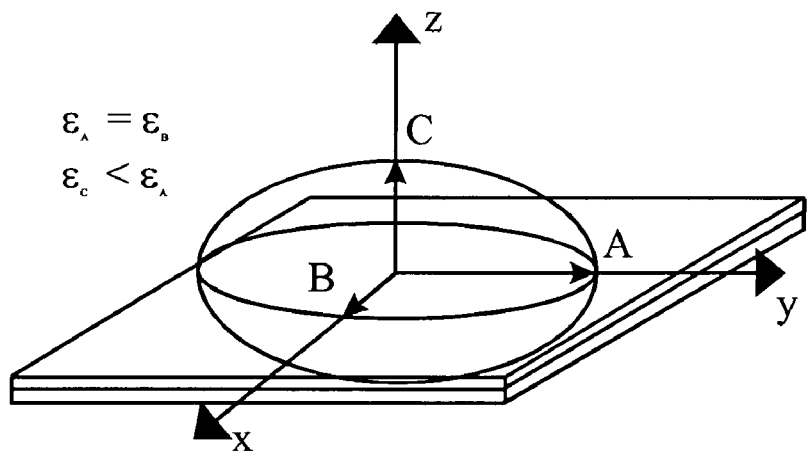
FIG. 14 demonstrates a principal dielectric tensor axes orientation in cases including a negative C-plate compensator.
Figure 15:
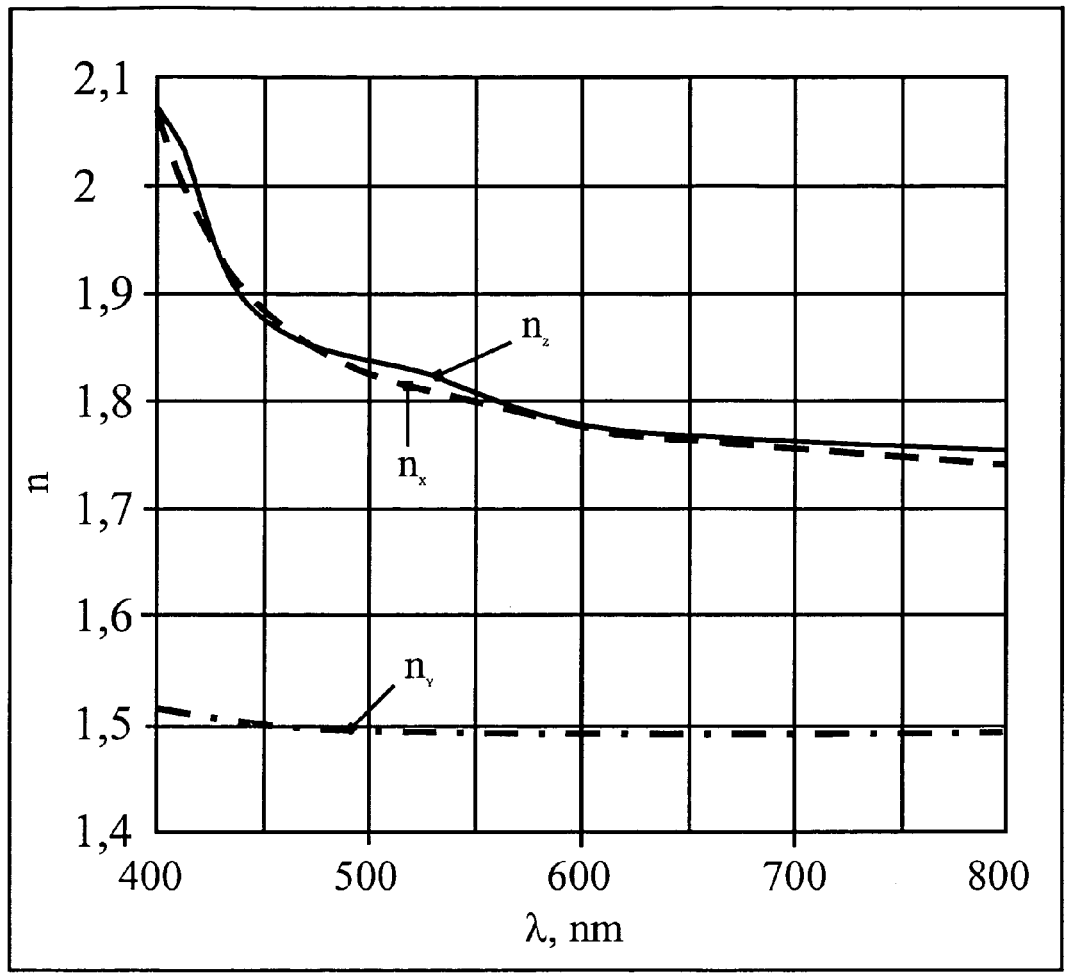
FIG. 15 is spectra of refraction indices of the retardation films in accordance with one embodiment of the present invention.
Figure 16:
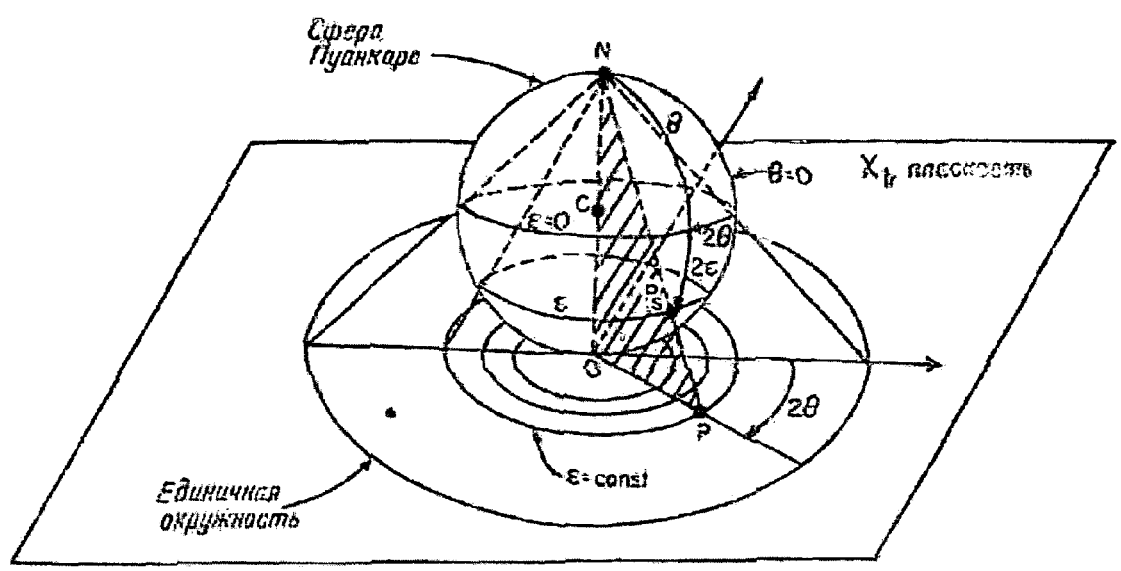
FIG. 16 is a Poincaré sphere showing polarization states in accordance with one embodiment of the present invention.

Uniaxial C-Plate is defined by value of Euler angle $\theta=0$ and $\in_A=\in_B,\neq\in_C$. Thus the principal C-axis is normal with respect to the plate surface (xy-plane). In a case of $\in_A=\in_B<\in_C$ the plate is called "positive C-plate" (FIG. 13). Contrary, if $\in_A = \in_B > \in_C$ the plate is defined as the "negative C-plate" (FIG. 14).

Similar to the A-plate case, the C-plates can be either positive ($\in_A = \in_B < \in_C$) or negative ($\in_A = \in_B > \in_C$).

The disclosed compensator for a liquid crystal display comprises at least one layer of negative biaxial birefringent material, which is thin crystal film (TCF) based on an aromatic polycyclic compound. This material usually possesses negative biaxial features $n^1_o \geqq n^{22}_o > n_e$. The extraordinary optical axes of the same materials coincide with direction of alignment. For practical applications the thin crystal films may be regard as uniaxial films: $n^1_o \approx n^2_o$.

Preferably a developed system of π-conjugated bonds between conjugated aromatic rings are present in the molecules and groups (such as amine, phenol, ketone, etc.) are lying in the plane of the molecule and involved into the aromatic system of bonds. The molecules and/or their molecular fragments possess a planar structure and are capable of forming supramolecules in solutions. Preferably there is the maximum overlap of π orbitals in the stacks of supramolecules. The selection of raw materials for manufacturing the compensator deals with spectral characteristics of these compounds.

Aromatic polycyclic compounds suitable for the obtaining of thin crystal films (TCFs) are characterized by the general formula {R} {F}n, where R is a polycyclic fragment featuring a π electron system, F is a modifying functional group ensuring solubility of a given compound in nonpolar or polar solvents (including aqueous media), and n is the number of functional groups.

The TCFs can be obtained by a method called Cascade Crystallization Process developed by Nitto Denko Corporation, Osaka, Japan. According to this method such an organic compound dissolved in an appropriate solvent forms a colloidal system (lyotropic liquid crystal solution) in which molecules are aggregated into supramolecules constituting kinetic units of the system. This liquid crystal phase is essentially a precursor of the ordered state of the system, from which a solid anisotropic crystal film is formed in the course of subsequent alignment of the supramolecules and removal of the solvent.

A method stipulated for the synthesis of thin crystal films from a colloidal system with supramolecules includes the following stages:

(i) application of the aforementioned colloidal system onto a substrate (or onto a device or a layer in a multilayer structure); the colloidal system must possess thixotropic properties, which are provided by maintaining a preset temperature and a certain concentration of the dispersed phase;

(ii) conversion of the applied colloidal system into a high flow (reduced viscosity) state by any external action (heating, shear straining, etc.) decreasing viscosity of the solution; this action can be either applied during the whole subsequent alignment stage or last for a minimum necessary time, so that the system would not relax into a state with increased viscosity during the alignment stage;

(iii) external alignment action upon the system, which can be produced using mechanical factors or by any other means; the degree of the external action must be sufficient for the kinetic units of the colloidal system to acquire the necessary orientation and form a structure that would serve as a base of the crystal lattice of the anisotropic thin crystal film;

(iv) conversion of the aligned region of the layer from the state of reduced viscosity, achieved due to the external action, into the state of the initial or higher viscosity; this transition is performed so as not to cause disorientation of the anisotropic thin crystal film structure and not to produce surface defects;

(v) final stage of solvent removal (drying), in the course of which the anisotropic thin crystal film structure is formed; this stage can also include an additional thermal treatment (annealing) characterized by the duration, character, and temperature, which are selected so as to ensure full or at least partial removal of water molecules from said crystal hydrate structure, while retaining the structure of supramolecules and crystalline structure of conjugated aromatic crystalline layer intact.

In the resulting anisotropic TCF, the molecular planes are parallel to each other and the molecules form a three-dimensional crystal structure, at least in a part of the layer. Optimization of the production technology may allow the formation of a single-crystal film. These films are disclosed in the present invention as base for manufacturing negative A-plate.

The TCF thickness usually does not exceed approximately 1 mkm. The film thickness can be controlled by changing the content of a solid substance in the applied solution and by varying the applied layer thickness. In order to obtain the films possessing desired optical characteristics, it is possible to use mixed colloidal systems (such mixtures can form joint supramolecules).

The mixing of said organic compounds in solutions results in the formation of mixed aggregates of variable composition. The analysis of X-ray diffraction patterns for dye mixtures allow us to judge about the molecular packing in supramolecules by the presence of a characteristic diffraction peak corresponding to interplanar spacing in the range from 3.1 to 3.7 Å. In general, this value is common for aromatic compounds in the form of crystals and aggregates. The peak intensity and sharpness increase in the course of drying, however, no changes in the peak position are observed. This diffraction peak corresponds to the intermolecular spacing within aggregates (stacks) and has been observed in the X-ray diffraction patterns of various materials. The mixing is favored by the planar structure of molecules (or their fragments) and by the coincidence of one molecular dimension in the organic compounds under consideration. In the applied aqueous layer, the organic molecules possess a long-range order in one direction, which is related to the alignment of supramolecules on the substrate surface. As the solvent is evaporated, it is energetically favorable for the molecules to form a three-dimensional crystal structure.

Preferably the chemical compound for compensators is non-absorbing in working ranges. The series of new chemical compounds, namely acenaphtho[1,2-b]quinoxaline sulfoderivatives, can be synthesized which are well suited for the construction of optical compensators. These compounds have a general structural formula:

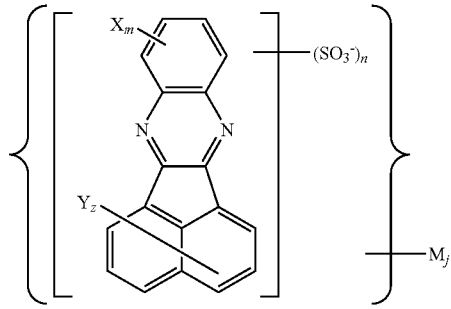

where n is an integer in the range of 1 to 4; m is an integer in the range of 0 to 4; z is an integer in the range of 0 to 6, and m+z+n≦10; X and Y are individually selected from the group consisting of $CH_3$, $C_2H_5$, $OCH_3$, $OC_2H_5$, Cl, Br, OH, and $NH_2$; M is a counter ion; and j is the number of counter ions in the molecule.

The material formed from an acenaphtho[1,2-b]quinoxaline sulfoderivative is well suited for the construction of optical compensators for liquid crystal displays, although the present invention is not limited by using only this compound.

The present invention expands the assortment of compounds that are either not absorbing or only weakly absorbing in the visible spectral region and that are capable of forming a lyotropic liquid crystal (LLC) phase. High optical anisotropy (up to Δn=0.6 in the visible spectral range) and high transparency (extinction coefficients are on the order of $10^{-3}$) of the films allow high-efficiency compensators for LCDs to be designed.

The following examples are provided to illustrate the invention and are not intended to limit the invention in any way.

EXAMPLE 1

A-plate compensator was produced according to the present invention and analyzed to determine the optical characteristics.

The liotropic liquid crystal contained 14% the mixture of sulfoderivatives of acenaphtho[1,2-b]quinoxaline and 0,1% PAV (Zonyl FS 300). The LLC was coated onto a glass substrate (Display Glass) with a Mayer rod #1.5 at a temperature of 20° C., and a relative humidity of 65%. The film was dried at the same humidity and temperature. The thickness of made film is 039 nm.

To determine optical characteristics of the film, sample transmission spectra were measured in polarized light in the wavelength range from 400 to 800 nm using Cary-500 spectrophotometer. The obtained data were used to calculate of the refraction indices tensor components ($n_X$, $n_Y$, $n_Z$) (FIG. 7). Here Z-axis is perpendicular to the surface of the film and Y-axes is parallel to the alignment direction. The produced film is A-plate compensator and exhibits high retardation characteristic $\Delta n = n_X - n_Y$ increasing from 0.24 up to 0.48 in the visible spectral range. The low values of absorption coefficients ($k_{X,Y,Z} < 2*10^{-3}$) confirm high transparency of the film.

EXAMPLE 2

A-plate compensator was produced according to the present invention and analyzed to determine the film's optical characteristics. 12 g of the mixture of sulfoderivatives of acenaphtho[1,2-b]quinoxaline were introduced with stirring at a temperature 20° C. into 65.0 g of deionized water. Then 5.3 ml of 25% aqueous ammonia solution were added and the mixture stirred to complete dissolution. The solution was concentrated on rotary evaporator to 30% and coated onto a polymer substrate (SONY-film, "Zeonor") with a Mayer rod #2.5 at a linear rate of 15 mm s$^{-1}$, a temperature of 20° C., and a relative humidity of 65%. The film was dried at the same humidity and temperature. This film on the substrate is a negative A-plate compensator.

To determine optical characteristics of the film, sample transmission spectra were measured in polarized light in the wavelength range from 400 to 800 nm using Cary-500 spectrophotometer. The findings demonstrate a very low absorbance of the film in the visible spectral range at the wavelength above 430 nm.

The obtained data were used to calculate refraction indices ($n_e$, $n_o$) and absorption coefficients ($k_e$, $k_o$) parallel and perpendicular to the alignment direction (FIG. 8). The produced film is optically anisotropic and exhibits high retardation characteristic $\Delta n = n_o - n_e$ increasing from 0.21 up to 0.38 in the visible spectral range. The low values of absorption coefficients ko and ke confirm high transparency of the film.

EXAMPLE 3

C-plate compensator was produced according to the present invention as multilayer structure. This compensator has been obtained in the following way. Initially, anisotropic layer TCF has been formed on the polymer substrate as it was described above. Then, the separating layer of SiO$_2$ with thickness of 100 nm was deposited, and another the same anisotropic layer was deposited such that the directions of the optical axes of the first and the second anisotropic layers would be perpendicular. Any suitable transparent material may be used as the separating layer, for example: lacquer, polymer and etc.

From the foregoing it will be appreciated that, although specific embodiments of the invention have been described herein for purposes of illustration, various modifications may be made without deviating from the spirit and scope of the invention.

We claim:

1. A compensator for two polarizers in dark-state comprising layers of birefringent materials, wherein one of said layers operates as a positive A-plate, another of said layers operates as a negative A-plate, and a C-plate is placed between said A-plates.

2. The compensator according to claim 1, wherein said C-Plate is a negative C-plate.

3. The compensator according to claim 1, wherein said negative A-plate comprises at least one layer of a birefringent material wherein the birefringent material has a crystal structure formed by at least one polycyclic organic compound with conjugated π-system, and an intermolecular spacing of 3.4±0.3 Å is in the direction of at least one of optical axes.

4. The compensator according to claim 2, wherein said negative C-plate comprises at least one layer of a birefringent material wherein the birefringent material has a crystal structure formed by at least one polycyclic organic compound with conjugated π-system, and an intermolecular spacing of 3.4±0.3 Å is in the direction of at least one of optical axes.

5. The compensator according to claim 1, wherein said C-Plate is a positive C-plate.

6. The compensator according to claim 1, further comprising at least two polarizers, wherein axes of transmission of said polarizers are mutually perpendicular.

7. The compensator according to claim 1 further comprising at least two polarizers, wherein at least one layer of birefringent material having optical thickness so as a direction of light polarization incident upon second polarizer is perpendicular to axis of transmission of this polarizer.

8. The compensator according to any of claims 3 or 4, wherein the organic compound comprises modifying ionogenic functional groups selected from the group consisting of —COOH, —SO$_3$H, PO$_3$H, and NH$_2$.

9. The compensator according to claim 8, wherein the organic compound is an acenaphtho[1,2-b]quinoxaline sulfoderivative of the general structural formula:

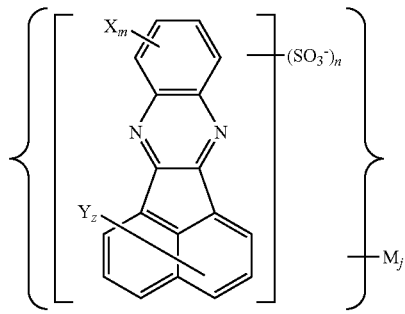

Where n is an integer in the range of 1 to 4;

m is an integer in the range of 0 to 4;

z is an integer in the range of 0 to 6, and m+z+n≦10;

X and Y are individually selected from the group consisting of $CH_3$, $C_2H_5$, $OCH_3$, $OC_2H_5$, Cl, Br, OH, and $NH_2$;

M is a counterion; and

J is the number of counterions in the molecule.

10. The compensator according to claim 9, wherein the structural formula of acenaphtho[1,2-b]quinoxaline sulfo-derivative is chosen from the group consisting of structures I-VIII:

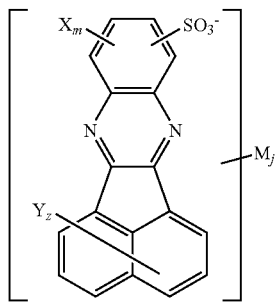
I where m is an integer in the range of 0 to 3, and z is an integer in the range of 0 to 6;

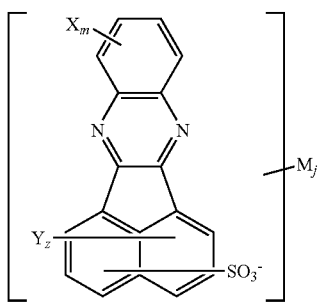
II where m is an integer in the range of 0 to 4, and z is an integer in the range of 0 to 5;

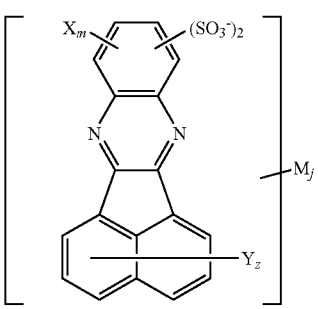
III where m is an integer in the range of 0 to 2, and z is an integer in the range of 0 to 6;

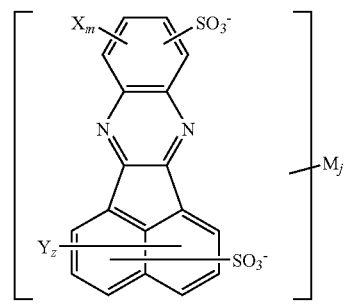
IV where m is an integer in the range of 0 to 4, and z is an integer in the range of 0 to 4;

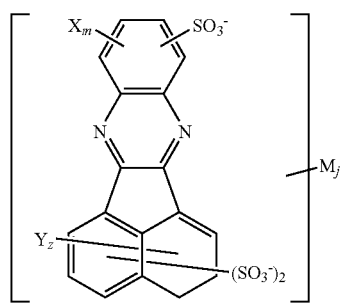
V where m is an integer in the range of 0 to 3, and z is an integer in the range of 0 to 5;

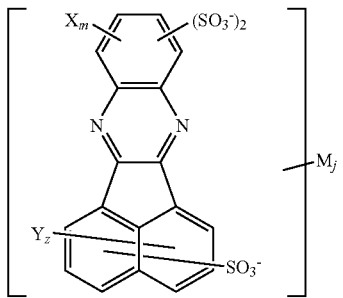
VI where m is an integer in the range of 0 to 3, and z is an integer in the range of 0 to 4;

VII where m is an integer in the range of 0 to 2, and z is an integer in the range of 0 to 5;

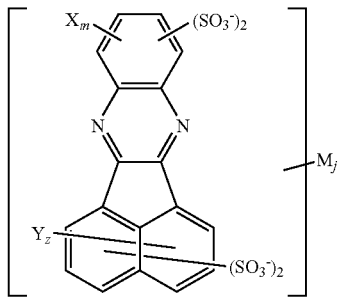

VIII where m is an integer in the range of 0 to 2, and z is an integer in the range of 0 to 4;

and where X, Y are individually selected from the group consisting of $CH_3$, $C_2H_5$, $OCH_3$, $OC_2H_5$, Cl, Br, OH, and $NH_2$, M is a counterion, and j is the number of counterions in the molecule.

11. The compensator according to claim 1, wherein retardance of said each A-plate is $\lambda/6$.

12. The compensator according to claim 1, wherein retardance of said C-plate is $\sqrt{3}\lambda/6$.

13. A liquid crystal display, comprising:

a liquid crystal cell, and a compensator according to claim 1.

* * * * *